3,030,278
PRODUCTION OF HYDROCORTISONE BY MULTIPLE FERMENTATION
Celestino Spalla, Renato Modelli, and Alba Maria Amici, Milan, Italy, assignors to Societa Farmaceutici Italia, Milan, Italy, a corporation of Italy
No Drawing. Filed Sept. 28, 1960, Ser. No. 58,901
Claims priority, application Italy Sept. 30, 1959
5 Claims. (Cl. 195—51)

This invention is directed to a process for producing hydrocortisone by dehydrogenation of a secondary alcoholic group, transposition of a double bond, and introduction of oxygen in the molecule of a pregnane derivative, in a single fermentative process while using two species of micro-organisms.

The starting substances are pregnane derivatives, and are characterized in that they have an alcohol group in the 3-position, a double bond in 5-6 position, while lacking oxygen or functions thereof in the 11-position.

Said substances can be obtained from diosgenine, which in turn is produced by a number of species of Mexican plants belonging to the family of Dioscoreaceae.

It is known that *Corynebacterium mediolanum* produces one or more enzymes which are capable of converting pregnenolone to progesterone (see L. Mamoli: B 71, 1938, p. 2701; note also L. Mamoli, B 72, 1939, p. 1863, in relation to transformation of 21-acetoxy-pregnenolone to desoxycorticosterone by means of *C. mediolanum*.)

We have now found that *C. mediolanum* produces enzymes capable of causing the same transformation in 5-pregnene-3β,17α,21-triol-20-one. The latter can be readily obtained from diosgenine by chemical procedures.

The product thus obtained is compound S of Reichstein. It is known that some species of micro-organisms are capable of oxidizing compound S, while introducing a hydroxy group in the 11-position. Said species (*Cunninghamella blakesleana*: U.S. Patent 2,602,769; *Botrytis cinerea, Botrytis peoniae*: British Patent 789,862 and U.S. Patent 2,789,940; *Pycnosporium sp.* ATCC 12,231; U.S. Patent 2,848,370; *Curvularia lunata*: U.S. Patent 2,658,-023 and *Coniothyrium helleborine*: U.S. Patent 2,793,-163) may convert the compound S to hydrocortisone.

Normally, two distinct fermentative processes, each followed by extraction and purification of the obtained substances, are required for production of hydrocortisone, when 5-pregnene-3β,17α,21-triol-20-one is used as starting substance.

We have now found that both transformations can be carried out in a single process when the micro-organisms or the enzymes relative to both transformations are used successively on the starting steroid.

Said enzymes are produced by micro-organisms. In particular, the one capable of converting 5-pregnene-3β,17α,21-triol-20-one to the compound S is produced by *C. mediolanum*, whereas the one capable of converting the compound S to hydrocortisone is afforded by *Cunninghamella blakesleana*.

Examples of multiple transformations of steroids are known. They are carried out by use of more than one microbial strain. Various processes have been disclosed, characterized by the simultaneous or alternate use of micro-organisms belonging to relatively closely related systematic groups, and particularly by the use of species of the eumycetes group.

Said species require similar fermentation conditions: they grow at the same temperature, at a relatively low pH; they require culture media which in general are rich in carbohydrates and with the same ratio of aeration. In contrast, the employment of micro-organisms which are very dissimilar to each other, such as *C. blakesleana* and *C. mediolanum*, is extremely difficult to carry out, owing to the very different requirements of the two species. In particular, *C. blakesleana* grows best at 28° C., whereas *C. mediolanum* grows best at 33° C. Moreover, the first species requires a medium more rich in carbohydrates, a greater aeration, a lower starting pH and it has a shorter cycle of development.

A process is known for the production of prednisolone by use of the two systematically differing micro-organisms, namely *Curvularia lunata* and *Mycobacterium phley* (German Patent 1,050,335). The inventors state that no mutual negative influences between both strains were noticed.

As already stated above, we have discovered that *C. mediolanum* and *C. blakesleana* are capable of acting simultaneously on the molecule of 5-pregnene-3β,17α,21-triol-20-one, converting it to hydrocortisone. However, the transformation yields thus obtained are low. Moreover, very substantial amounts of undesired byproducts are formed, such as 14α-hydroxy derivatives and 6β-hydroxy derivatives of compound S. We have found methods of fermentation which overcome the above-mentioned disadvantages.

In order to avoid the depressing effect that would be caused by their growth at unsuitable temperatures, and by the different duration of fermentation, we cultivate two species separately, each under the required or optimum conditions, and mix them subsequently.

The noxious effect which is displayed by the cultures of *C. mediolanum* on the transformation of compound S to hydrocortisone by means of *C. blakesleana* has been overcome by preferably adding to the cultures of the second micro-organism very small quantities or percentages of cultures of the first.

Under the conditions which we have discovered and which are disclosed in detail in the following examples, *C. mediolanum* is able to convert to compound S amounts of 5-pregnene-3β,17α,21-triol-20-one which correspond to 5–8% by weight of fermentation broth volume, with yields varying from at least 80 to 90%. In this way since *C. blakesleana* converts only amounts corresponding to 0.5–1% by weight of fermentation broth volume (U.S. Patent 2,602,769), it suffices to mix both broths in ratios varying between 14:1 and 4:1. Under such conditions high conversions are obtained. However, byproducts are formed, namely 14α-hydroxy and 6β-hydroxy-derivatives of compound S.

We have discovered that the formation of said substances can be very markedly lowered, and in some cases avoided, by introducing certain substances into the fermentation broths. In particular, we have ascertained that the vitamin K (2-methyl-1,4-naphthoquinone) displays an inhibiting effect on the formation of said by-compounds, upon adding it in low doses when both cultures are mixed with each other. An analogous effect is attained by addition of varying amounts of a mixture of 95% ethanol and acetone in equal parts.

In this manner a high degree of conversion is attained, and with negligible amounts of byproducts.

A salient advantage of this invention is that it permits the elimination of the steps of extraction and purification of compound S from fermentation broths of *C. mediolanum* without exerting any negative or detrimental influence on the yields of the successive transformation to hydrocortisone with *C. blakesleana*. In this way, the losses which are inherent in the process of extracting compound S are avoided, so that higher total yields are attained.

This process results in the production of the hydrocortisone more economically, and with total yields which are higher than the ones attainable through the known methods described in the literature (P. L. Julian, E. W. Mayer, W. J. Karpel and J. R. Waller: Journal of American Chemical Society 72, 5145 (1950), H. J. Ringold, G. Rosenkranz, F. Sondheimer: Journal of American Chemical Society 78, 820 (1956)). According to said known methods, the raw materials which are available from sapogenines, such as 5,16-pregnadiene-3β-ol-20-one or its derivatives, are converted by chemical methods to compound S, which is subsequently fermented to hydrocortisone.

The preparation of compound S chemically is complex, since it requires a number of steps. Accordingly, its total yields are low. In contrast thereto, the transformation of 5,16-pregnadiene-3β-ol-20-one to the 3,21-diesters or 21-monoesters of the 5-pregnene-3β,17α,21-triol-20-one occurs in a few steps, and with good yields (H. J. Ringold et al., Journal of Am. Chem. Soc. 78, 816 (1956), and 78, 820 (1956)).

Therefore, the primary significance of this method is that a product is utilized which is easily obtainable from the fundamental intermediate for the synthesis of corticosteroids, and said product is converted to hydrocortisone with good yields and in a single operation.

In carrying out this method, C. blakesleana and C. mediolanum are cultivated in liquid culture media containing carbohydrates, nitrogen substances, inorganic salts and growth factors.

The sources of carbohydrates for C. mediolanum are primarily glucose or saccharose, etc.; the nitrogen sources are aminoacids, yeast extract, ammonia salts, nitrates, casein hydrolisates, etc. The inorganic salts are, for example, $MgSO_4$, NaCl, $K_2HPO_4$, $KH_2PO_4$, $CaCO_3$ and salts of heavy metals. The growth factors are those contained in the yeast extract.

The sources of carbohydrates for C. blakesleana are, for example, meals, glucose, saccharose, molasses; the nitrogen sources are, for example, aminoacids, casein hydrolisates, peptone, meat extract. The inorganic salts are $MgSO_4$, $Na_2HPO_4$, $KH_2PO_4$, KCl. The growth factors are those contained in yeast extract.

C. mediolanum grows at 34° C. in liquid culture medium under aeration and stirring. At the moment of inoculation, addition is made of the starting steroid (5-pregnene-3β,17α,21-triol-20-one or the corresponding 3- or 21-acetate or 3,21-diacetate, dissolved in alcohol or acetone or sterilized by heat), and it is incubated for a time varying from 70 to 90 hours. During this period the transformation is controlled by means of paper chromatography and determination of adsorption at 240 mµ.

When the fermentation with C. mediolanum is completed, the culture broth is added to a culture of C. blakesleana grown on a suitable medium, at 28° C., for 17 hours, in such amounts that, taking under consideration the contained concentration of compound S, the concentration of compound S desired in the broth of C. blakesleana is attained. Ethanol or methanol or ethanol-acetone (1:1) is added in the ratio 4–10%, and it is incubated for a time sufficient to result in the complete transformation of compound S (5 to 12 hours). Addition of vitamin K in the amount of 20 mg./l. has proved to be very useful.

Disappearance of compound S is followed or detected by paper chromatography of a methylene chloride extract of a broth portion, according to the technique of A. Zaffaroni (Rec. Prog. in Horm. Res., 8, 51 (1953)). At this point, compound S has been transformed to hydrocortisone with negligible percentages of cortisone and of 6β-hydroxy- and 14α-hydroxy-derivatives of compound S.

Titration of hydrocortisone as well as of the related compounds of conversion is carried out by a method described in the following examples.

The so obtained compounds, particularly cortisone and hydrocortisone, can be used directly as drugs, or employed as intermediates in the preparation of other substances, such as prednisone, and prednisolone.

The following examples of transformation processes are illustrative embodiments of the invention without intent to restrict its scope.

EXAMPLE 1

Stage A

In a 500 ml. flask, 100 ml. of the following medium A are sterilized:

| | Percent |
|---|---|
| Dry yeast | 0.6 |
| NaCl | 0.2 |
| $Na_2HPO_4 \cdot 12H_2O$ | 0.4 |
| $KH_2PO_4$ | 0.18 |
| Glucose | 0.5 |
| Tapwater. | |

The liquid is inoculated with a 48 h. culture of C. mediolanum on Penassy seed agar Difco.

Together with the inoculum, 870 mg. of 5-pregnene-3β,17α,21-triol-20-one-3,21-diacetate suspended in 5 ml. water and sterilized at 100° C. for 30 minutes are introduced. The culture is incubated at 33° C. under agitation for 72 hours after which the microbiological transformation can be considered completed.

The progress of the fermentation is followed by isolating the fermentation product by extraction with methylene chloride, and determining the ultraviolet absorption at 240 mµ of the formed compound S, and moreover by paper chromatography of the extract. At intervals of 1 hour, 2 ml. broth are sampled, diluted with 2 ml. ethanol and 0.2 g. celite added. The mixture is filtered under vacuum, and the filter is washed with 5 ml. water heated at 40–50° C. The clear filtrate is extracted with 20 ml. methylene chloride, the extract is washed with water, then dried on $Na_2SO_4$, evaporated until dryness under vacuum and taken again with 50 ml. methanol, to obtain a methanolic solution which, for a quantitative transformation of the 5-pregnene-3β,17α,21-triol-20-one-3,21-diacetate to the compound S, should contain 26.5 mg. of compound S for 100 ml. solution. 10 ml. of this solution (corresponding to 2.65 mg.) are diluted with methanol to 265 ml. to obtain a solution containing 1 mg. of compound S for 100 ml. methanol. The absorption at U.V. of this solution is determined: the transformation is completed when the maximum of U.V. absorption is displayed at 240–242 mµ, and the extinction at said wave length will have reached its highest value.

The percentage (T percent) of transformation in compound S is given by equation:

$$T \text{ percent} = \frac{A \cdot 1000}{480}$$

wherein A represents the absorbance value of the solution, and 480 is the $$E^{1\%}_{1\text{ cm.}}$$

of the pure compound S.

A paper chromatography is carried out as follows: 2 ml. portion of fermentation broth is extracted thoroughly with methylene chloride; after washing with water and drying on $Na_2SO_4$ it is evaporated until dryness.

The extraction residue is taken up again with 1.33 ml. of methanol, then 0.02 ml. of this solution is sampled and absorbed on the top of paper strips of chromatography paper (Mackery, Nagel and Co., No. 214). The descending chromatography is carried out, while using as stationary phase a mixture made up of one part propylene glycol and three parts methanol, and as running phase a mixture made up of one part benzene, 0.5 part methanol and one part water, with rejeciton of the lower aqueous layer.

When the solvent front has reached a position at about 1 cm. from the bottom of the paper strips, the chromatographic development is stopped and the presence and position of the spots having blue fluorescence under U.V. light are determined, according to the methodology of W. J. Haines and J. N. Karnewaat, Methods of Biochem. Analysis, vol. I, 1945, page 171, Interscience Publ.

In said system, compound S produces a spot with blue fluorescence having an Rf of 0.40. For a qualitative determination the fluorescent spot is eluted with methanol, and the U.V. absorbance at 240 mµ is determined.

In order to test for the presence of 5-pregnene-3β,17α,21-triol-20-one acetate, which is transparent at U.V. light, the tapes are sprayed with a solution of phosphomolibdic acid according to D. Kritchecsky and M. R. Kirk: Arch. Biochem. Biophys. 35, 346 (1952); a blue spot appears in correspondence with the steroid position. In the above said system, the 5-pregnene-3β,17α,21-triol-20-one-3, 21-diacetate shows an Rf of 0.85. Conversion to compound S occurs with a yield of about 90% of the theoretical.

*Stage B*

In another 500 ml. flask 100 ml. of the following medium B are sterilized:

| | Percent |
|---|---|
| Glucose | 2 |
| NZ-amine E | 0.5 |
| Caseine | 0.4 |
| NaCl | 0.5 |
| $K_2HPO_4$ | 0.5 |
| $MgSO_4 \cdot 7H_2O$ | 0.1 |
| Molasses | 0.2 |
| Yeast extract | 0.2 |
| Tap water. | |

This medium is inoculated with 10 days' culture of *C. blakesleana* on agar malt. It is incubated for 17 hours at 28° C. under stirring.

Inoculation of flasks of *C. blakesleana* as well as of those of *C. mediolanum* is carried out in such an order that when the latter is 72 hours old the former will be 17 hours old.

At this moment, to 90 ml. culture broth of *C. blakesleana*, 10 ml. of the cultured incubated broth of *C. mediolanum* described above are added. To each flask 5 ml. of a mixture (1:1) of 95% ethanol and acetone are added, and it is incubated at 28° C. under stirring for 12 hours.

At this time the chromatographic examination shows that compound S has disappeared, so that the fermentation will be considered at end.

Chromatographic titration shows the formation of an amount of hydrocortisone corresponding to 70% of the theoretical conversion of the compound S which was present at beginning of the second phase.

EXAMPLE 2

Example 1 is duplicated as regards preparation of culture broths. The 17 hours old liquid cultures of *C. blakesleana* are filtered on sterile cotton, and the mycelium remaining on the filter is added to the culture broth of *C. mediolanum* which originally contains 32 mg. 5 - pregnene-3β,17α,21-triol-20-one-3,21-diacetate. Then it is carried out as described in Example 1.

EXAMPLE 3

Example 1 is duplicated, with the only exception that in place of 870 mg. of 5-pregnene-3β,17α,21-triol-20-one-3,21-diacetate, 780 mg. of 5-pregnene-3β,17α,21-triol-20-one-21-acetate are added. This latter shows, in the above described chromatographic system, an Rf=0.56.

The hydrocortisone yield is comparable, on the molecular base, with that obtained in Example 1.

EXAMPLE 4

Example 1 is duplicated, with the only exception that in place of diacetate, 700 mg. of 5-pregnene-3β,17α,21-triol-20-one are introduced.

The hydrocortisone yield is comparable on the molecular base, with that obtained in Example 1.

EXAMPLE 5

3000 ml. of medium A prepared as in Example 1 are sterilized at 120° C. for 60 minutes in a 10-liter laboratory fermentation vessel.

It is inoculated with a portion of *C. mediolanum* culture obtained in flasks under stirring, and 7.400 g. per liter (i.e. totally 22,200 g.) of 5-pregnene-3β,17α,21-triol-20-one-3,21-diacetate are added, which has been previously sterilized in suspension in distilled water at 100° C. for 30 minutes.

The culture is kept under stirring at 400 r.p.m. with an air stream of 0.5 liter of air per liter of culture per minute at 33° C. for 80 hours, until the conversion of compound S can be considered completed with a 91% conversion yield.

In three 10-liter fermentation vessels 5 liters of medium B of Example 1 are sterilized at 120° C. for 105 minutes, then are inoculated with a portion of a 30 hours old culture of *C. blakesleana* which was grown in the same medium in a stirred flask.

Fermentation is carried out under stirring at 400 r.p.m. and aeration at the rate of 0.75 liter of air per liter of culture per minute at 28° C.

Inoculation of fermentation vessels of *C. blakesleana* and of *C. mediolanum*, respectively, is carried out in such a time order that when the second will be 80 hours old the first will be 18 hours old.

At this moment to each of the 3 fermentation vessels of *C. blakesleana*, 1000 ml. of *C. mediolanum* culture broth are added, so that in each fermentator an amount of 5.400 g. of compound S will be contained, corresponding to about 0.9% (totally 16.2 g.).

To each fermentation vessel 420 ml. of a mixture (1:1) of 95% ethanol and acetone and 120 mg. vitamin K are added. Fermentation is continued for additional 6 hours, then it is blocked by adding 10% of $(NH_4)_2SO_4$. The content of the 3 fermentators is combined, then it is stirred for 15 minutes with 210 g. Hyflo Supercel and the broth is filtered by a centrifuge containing a previous layer of 60 g. Hyflo Supercel. The mycelium mass is washed with 3 liters of water heated at 45–50° C.; the filtrate is cooled at 8–12° C. and extracted in a separator funnel with 20 liters methylene chloride. The organic extract is then washed with 1 liter deionized water, then dried on 400 g. sodium sulfate for at least 4 hours.

20 g. adsorbing carbon are added and it is left to stand under occasional stirring for an additional hour, then it is filtered and finally the solvent is evaporated under vacuum.

The residue consists of 16 g. of a yellowish-white substance, having an M.P=190–195° C. Said residue is dissolved in 800 ml. boiling dichloroethane, while filtering off an occasional suspension. Needle-shaped crystals are formed at once which after standing overnight at 0° C. are filtered and collected, then dried at 90° C. for 2 hours under vacuum. In fact, hydrocortisone crystallized from dichloroethane together with 10–12% of crystallization solvent, which can be removed by heating under vacuum, 11.5 g. hydrocortisone are obtained (M.P. 224–228° C.).

EXAMPLE 6

The procedure is as in Example 5, for the preparation of *C. mediolanum* culture broths, in 10-liter fermentation vessels with 6000 ml. medium A.

The culture of *C. mediolanum*, to which 0.9% (5.4 g.) 5-pregnene-3β,17α,21-triol-20-one-3,21-diacetate is added, is fermented for 88 hours under the conditions set forth in Example 5.

The mycelium of a culture broth of *C. blakesleana* obtained as in Example 5 is allowed to settle, then the overlying broth is drawn up by a suction tube provided with a sterile cotton filter. The *C. mediolanum* culture broth is added to the mycelium, to obtain a final concentration of compound S of about 0.5%.

A 5% moiety of acetone and 20 mg./l. of vitamin K are added and fermentation is continued for an additional 6 hours, after which the procedure is as described in Example 5. Extraction is carried out with methylene chloride, washings are carried out, followed by evaporation to dryness. The residue is crystallized from dichloroethane, pure hydrocortisone being obtained with a 56% yield with respect to the initially charged amount of 5-pregnene-3β,17α,21-triol-20-one-diacetate.

EXAMPLE 7

Example 5 is duplicated, with the exception that instead of charging 22.200 g. of 5-pregnene-3β,17α-21-triol-20-one-3,21-diacetate, 20.100 g. of 5-pregnene-3β,17α,21-triol-20-one-3-acetate are charged. The hydrocortisone yield is one of the same order as in Example 5.

EXAMPLE 8

Example 5 is duplicated, with the exception that instead of charging 22.200 g. of 5-pregnene-3β,17α,21-triol-20-one-3,21-diacetate, 18 g. of 5-pregnene-3β,17α,21-triol-20-one are charged.

EXAMPLE 9

This example is carried out as in the preceding example, with the exception that instead of charging 5.4 g. of 5-pregnene-3β,17α,21-triol-20-one-3,21-diacetate, 4.8 g. of 5-pregnene-3β,17α,21-triol-20-one-3-acetate are charged.

EXAMPLE 10

This duplicates Example 6, with the exception that instead of charging 5.4 g. of 5-pregnene-3β,17α,21-triol-20-one-3,21-diacetate, 4.3 g. of 5-pregnene-3β,17α,21-triol-20-one are charged. The hydrocortisone yield is comparable with that of Example 6.

In their preferred aspect, the processes described are summarized as follows:

Producing hydrocortisone (4-pregnene-17α,11β,21-triol-3,20-dione) by a method which comprises: (1) subjecting the 5-pregnene-3β,17α,21-triol-20-one or the corresponding 3,21-diacetate or the 3- or 21-monoacetate to the action, under aerobic conditions, of the micro-organism Corynebacterium mediolanum, or enzymes thereof, to selectively dehydrogenate the 3-position of the steroid and transpose the double bond from $\Delta^5$ to $\Delta^4$; (2) mixing the fermentation broth containing the aforesaid micro-organism and the resulting 3-keto-$\Delta^4$-steroid with a broth containing a culture of Cunninghamella blakesleana in variable ratios from 1:14 to 1:4; (3) adding substances which inhibit the formation of by-products such as vitamin K (2-methyl-1,4-naphthoquinone) in the amount of 10–30 mg. per liter and methanol or ethanol or ethanol-acetone (1:1) in a ratio of 6–10% in volume; (4) subjecting the resulting broth, under aerobic conditions, to the action of the micro-organism Cunninghamella blakesleana, or enzymes thereof, which will selectively oxygenate the 11 position of the steroid; (5) isolating the resulting hydrocortisone by known procedure.

We claim:

1. A process of converting a compound taken from the group consisting of 5-pregnene-3β,17α,21-triol-20-one and the corresponding 3-acetate, 21-acetate, and 3,21-diacetate, into hydrocortisone, comprising preparing a broth of the organism Cunninghamella blakesleana in a nutrient culture medium, culturing an aqueous nutrient medium containing said compound under aerated conditions by means of the organism Corynebacterium mediolanum, to produce a cultured broth containing Reichstein compound S, incorporating said broth of C. blakesleana with said cultured broth, and continuing the fermentation to convert compound S to hydrocortisone, said conversion of compound S being carried out with addition of vitamin K to inhibit the formation of byproducts, the broth of C. blakesleana being in major amount with respect to the cultured broth of C. mediolanum.

2. A process of converting a compound taken from the group consisting of 5-pregnene-3β,17α,21-triol-20-one and the corresponding 3-acetate, 21-acetate and 3,21-diacetate into hydrocortisone, comprising preparing a broth of the organism Cunninghamella blakesleana in a nutrient culture medium, culturing an aqueous nutrient medium containing said compound under aerated conditions by means of the organism Corynebacterium mediolanum, to produce a cultured broth containing Reichstein compound S, incorporating said broth of C. blakesleana with said cultured broth and continuing the fermentation to convert compound S to hydrocortisone, said conversion of compound S being carried out with addition of ethanol and acetone to inhibit the formation of byproducts, the broth of C. blakesleana being in major amount with respect to the cultured broth C. mediolanum.

3. The process defined in claim 1, the broths of the two organisms being employed in admixture in the ratio range of 14:1 to 4:1, of the broth of C. blakesleana to the cultured broth of C. mediolanum.

4. The process of claim 2, the broths of the two organisms being employed in admixture in the ratio range of 14:1 to 4:1, of the broth of C. blakesleana to the cultured broth of C. mediolanum.

5. A process for converting a compound taken from the group consisting of 5-pregnene-3β,17α,21-triol-20-one and the corresponding 3-acetate, 21 acetate and 3,21-diacetate into hydrocortisone, which comprises fermenting an aqueous nutrient medium containing said compound under aerated conditions by means of the organism Corynebacterium mediolanum to produce a cultured broth containing Reichstein compound S, mixing said cultured broth with a cultured broth containing the organism Cunninghamella blakesleana and continuing the fermentation to convert the compound S to hydrocortisone, said conversion of compound S to hydrocortisone being carried out in the presence of at least one substance taken from the group consisting of vitamin K, ethanol and acetone, said substance inhibiting the formation of byproducts.

References Cited in the file of this patent

UNITED STATES PATENTS

| 2,602,769 | Murray et al. | July 8, 1952 |
| 2,831,798 | McAleer et al. | Apr. 22, 1958 |

OTHER REFERENCES

Mamoli: Chemische Berichte 71, 1938, pages 2701–2702.